US006948056B1

(12) United States Patent
Roth et al.

(10) Patent No.: US 6,948,056 B1
(45) Date of Patent: Sep. 20, 2005

(54) MAINTAINING EVEN AND ODD ARRAY POINTERS TO EXTREME VALUES BY SEARCHING AND COMPARING MULTIPLE ELEMENTS CONCURRENTLY WHERE A POINTER IS ADJUSTED AFTER PROCESSING TO ACCOUNT FOR A NUMBER OF PIPELINE STAGES

(75) Inventors: Charles P. Roth, Austin, TX (US); Ravi Kolagotla, Austin, TX (US); Jose Fridman, Brookline, MA (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 695 days.

(21) Appl. No.: 09/675,066

(22) Filed: Sep. 28, 2000

(51) Int. Cl.[7] .............................................. G06F 7/02
(52) U.S. Cl. ................................. 712/300; 708/207
(58) Field of Search .............................. 712/300, 223, 712/21, 244; 708/207, 236, 524, 671; 711/220

(56) References Cited

U.S. PATENT DOCUMENTS

| 4,774,688 A | 9/1988 | Kobayashi et al. |
| 5,187,675 A | 2/1993 | Dent et al. |
| 5,991,785 A * | 11/1999 | Alidina et al. .............. 708/207 |

FOREIGN PATENT DOCUMENTS

WO  WO 99 23548  5/1999

OTHER PUBLICATIONS

Stroustrup, Bjame, The C++ Programming Language, 1997, Addison-Wessley, Third Edition, pp. 92 and 93.*
Simultaneous Address Relocation and Correction, IBM Technical Disclosure Bulletin, Nov. 1, 1964, vol. 7, issue 6, pp. 471-472.*
"ALU Implementating Native Minimum/Maximum Function for Signal Processing Applications", IBM Technical Dislcosure Bulletin, IBM Corp. New York, Oct. 1, 1986 vol. 5, No. 29.pp. 1975-1978.

* cited by examiner

Primary Examiner—Eddie Chan
Assistant Examiner—Tonia L. Meonske
(74) Attorney, Agent, or Firm—Fish & Richardson P.C.

(57) ABSTRACT

In one embodiment, a programmable processor searches an array of N data elements in response to N/M machine instructions, where the processor has a pipeline configured to process M data elements in parallel. In response to the machine instructions, a control unit directs the pipeline to retrieve M data elements from the array of elements in a single fetch cycle, concurrently compare the data elements to M current extreme values, and update the current extreme values, as well as M references to the current extreme values, based on the comparisons.

4 Claims, 6 Drawing Sheets

US 6,948,056 B1

MAINTAINING EVEN AND ODD ARRAY POINTERS TO EXTREME VALUES BY SEARCHING AND COMPARING MULTIPLE ELEMENTS CONCURRENTLY WHERE A POINTER IS ADJUSTED AFTER PROCESSING TO ACCOUNT FOR A NUMBER OF PIPELINE STAGES

BACKGROUND

This invention relates to array searching operations for a computer.

Many conventional programmable processors, such as digital signal processors (DSP), support a rich instruction set that includes numerous instructions for manipulating arrays of data. These operations are typically computationally intensive and can require significant computing time, depending upon the number of execution units, such as multiply-accumulate units (MACs), within the processor.

DESCRIPTION

Figure 1:
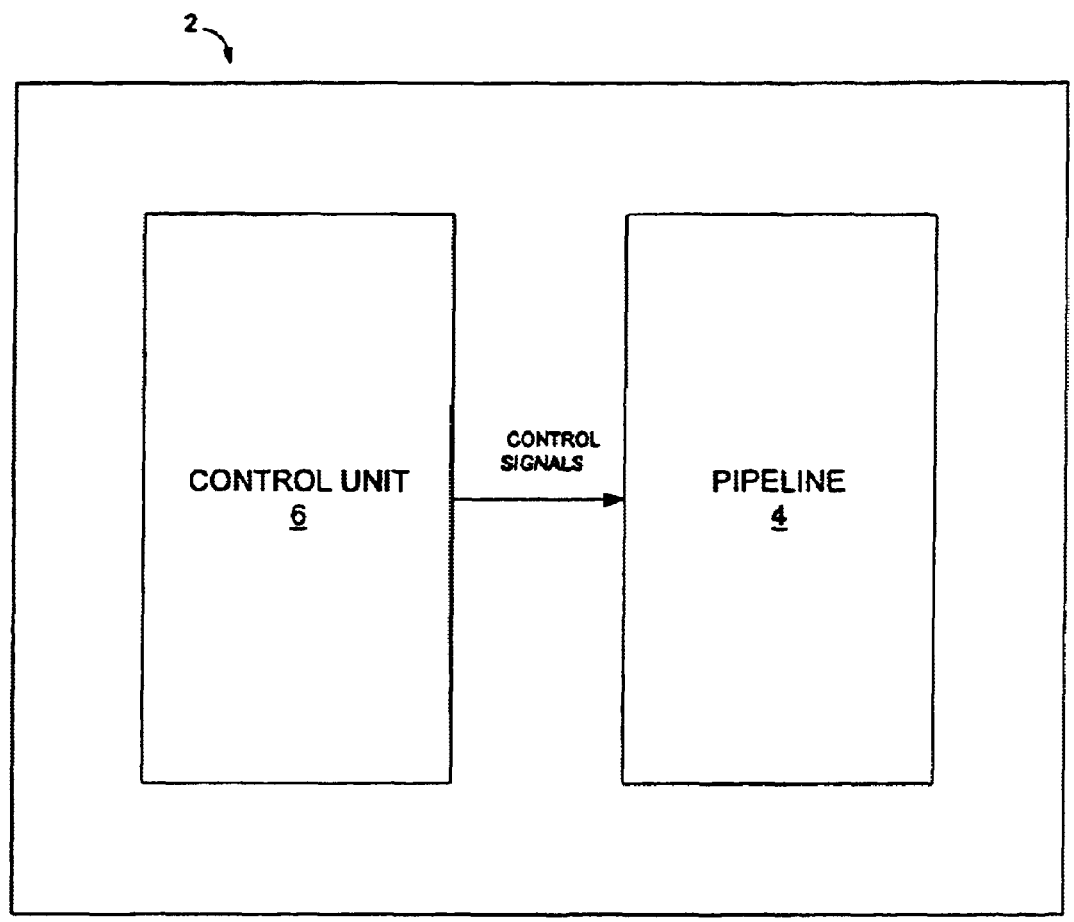
FIG. 1 is a block diagram illustrating an example of a pipelined programmable processor.

FIG. 1 is a block diagram illustrating a programmable processor 2 having an execution pipeline 4 and a control unit 6. Processor 2, as explained in detail below, reduces the computational time required by array manipulation operations. In particular, processor 2 may support a machine instruction, referred to herein as the SEARCH instruction, that reduces the computational time to search an array of numbers in a pipelined processing environment.

Pipeline 4 has a number of stages for processing instructions. Each stage processes concurrently with the other stages and passes results to the next stage in pipeline 4 at each clock cycle. The final results of each instruction emerge at the end of the pipeline in rapid succession.

Control unit 6 controls the flow of instructions and data through the various stages of pipeline 4. During the processing of an instruction, for example, control unit 6 directs the various components of the pipeline 4 to fetch and decode the instruction, perform the corresponding operation and write the results back to memory or local registers.

Figure 2:
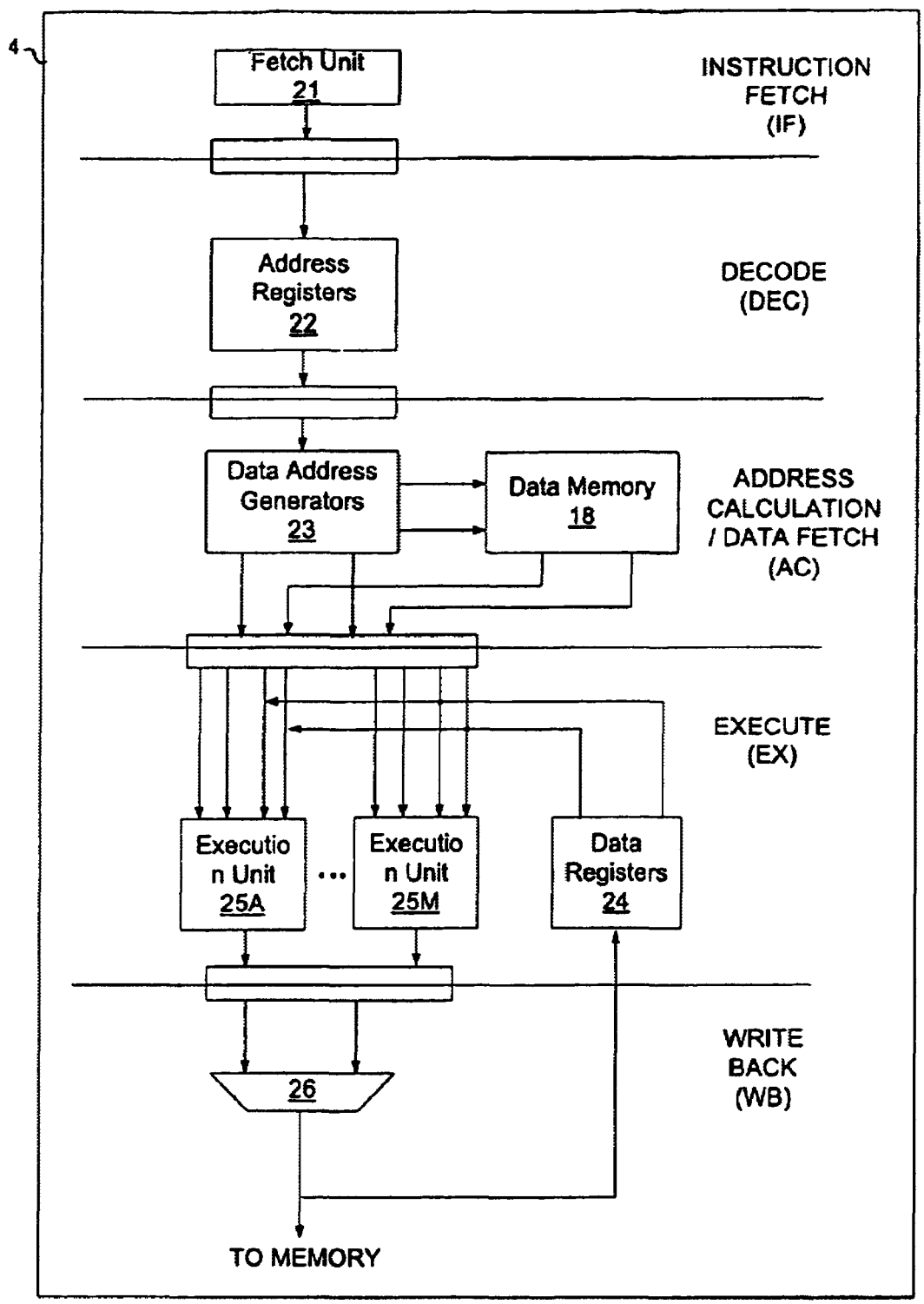
FIG. 2 is a block diagram illustrating an example execution pipeline for the programmable processor.

FIG. 2 illustrates an example pipeline 4 configured according to the invention. Pipeline 4, for example, has five stages: instruction fetch (IF), decode (DEC), address calculation (AC), execute (EX) and write back (WB). Instructions are fetched from memory, or from an instruction cache, during the IF stage by fetch unit 21 and decoded within address registers 22 during the DEC stage. At the next clock cycle, the results pass to the AC stage, where data address generators 23 calculate any memory addresses that are necessary to perform the operation.

During the EX stage, execution units 25A through 25M perform the specified operation such as, for example, adding or multiplying numbers, in parallel. Execution units 25 may contain specialized hardware for performing the operations including, for example, one or more arithmetic logic units (ALU's), floating-point units (FPU) and barrel shifters. A variety of data can be applied to execution units 25 such as the addresses generated by data address generator 23, data retrieved from data memory 18 or data retrieved from data registers 24. During the final stage (WB), the results are written back to data memory or to data registers 24.

The SEARCH instruction supported by processor 2, may allow software applications to search an array of N data elements by issuing N/M search instructions, where M is the number of data elements that can be processed in parallel by execution units 25 of pipeline 4. Note, however, that a single execution unit may be capable of executing two or more operations in parallel. For example, an execution unit may include a 32-bit ALU capable of concurrently comparing two 16-bit numbers.

Generally, the sequence of SEARCH instructions allows the processor 2 to process M sets of elements in parallel to identify an "extreme value", such as a maximum or a minimum, for each set. During the execution of the search instructions, processor 2 stores references to the location of the extreme value of each of the M sets of elements. Upon completion of the N/M instructions, as described in detail below, the software application analyzes the references to the extreme values for each set to quickly identify an extreme value for the array. For example, the search instruction allows the software applications to quickly identify either the first or last occurrence of a maximum or minimum value. Furthermore, as explained in detail below, processor 2 implements the operation in a fashion suitable for vectorizing in a pipelined processor across the M execution units 25.

Figure 3:
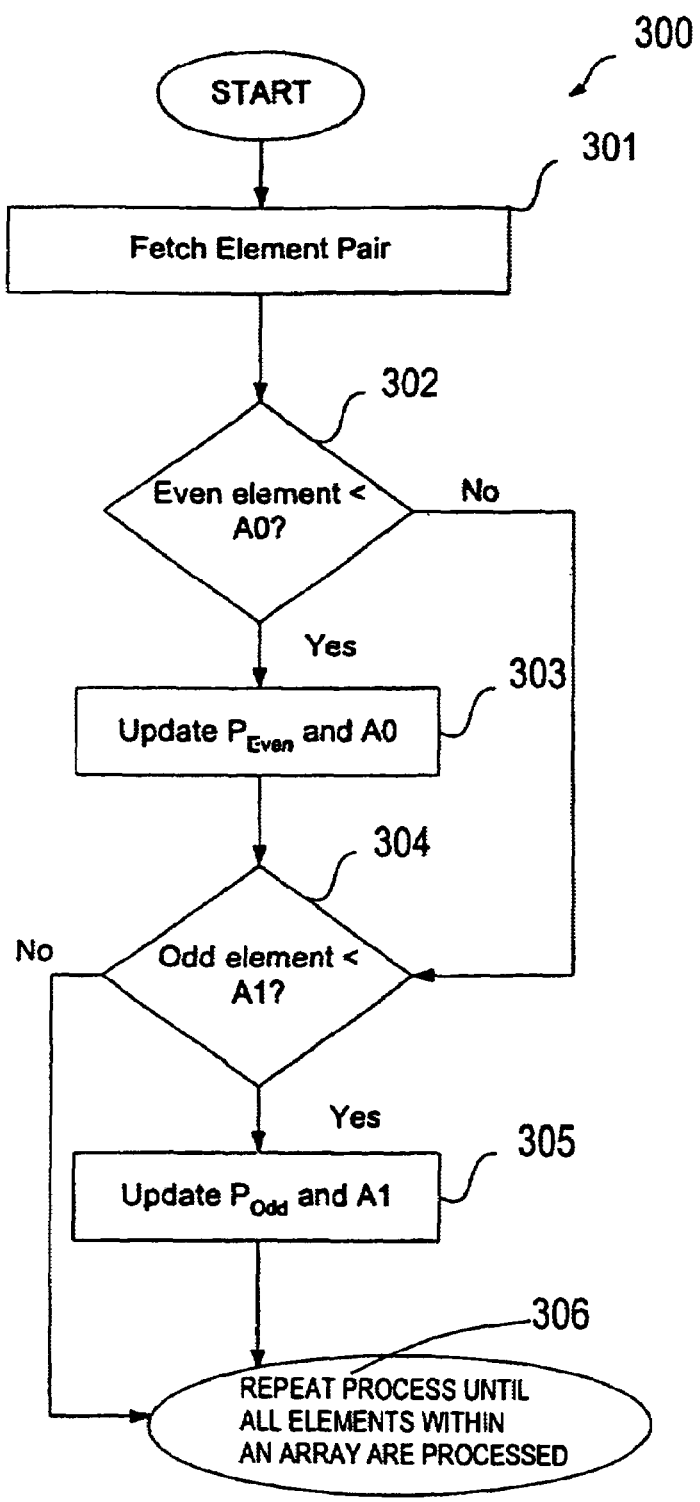
FIG. 3 is a flowchart for implementing an example array manipulation machine instruction.

As described above, a software application searches an array of data by issuing N/M SEARCH machine instructions to processor 2. FIG. 3 is a flowchart illustrating an example mode of operation 300 for processor 2 when it receives a single SEARCH machine instruction. Process 300 is described with reference to identifying the last occurrence of a minimum value within the array of elements; however, process 300 can be easily modified to perform other functions such as identifying the first occurrence of a minimum value, the first occurrence of a maximum value or a last occurrence of a maximum value.

For exemplary purposes, process 300 is described in assuming M equals 2, i.e., processor 2 concurrently processes two sets of elements, each set having N/2 elements. However, the process is not limited as such and is readily extensible to concurrently process more than two sets of elements. In general, process 300 facilitates vectorization of the search process by fetching pairs of elements as a single data quantity and processing the element pairs through pipeline 4 in parallel, thereby reducing the total number of clock cycles necessary to identify the minimum value within the array. Although applicable to other architectures, process 300 is well suited for a pipelined processor 2 having multiple execution units in the EX stage. For the two sets of elements, process 300 maintains two pointer registers, $P_{Even}$ and $P_{Odd}$, that store locations for the current extreme value within the corresponding set. In addition, process 300 maintains two accumulators, A0 and A1, that hold the current extreme values for the sets. The pointer registers and the accumulators, however, may readily be implemented as general-purpose data registers without departing from process 300.

Referring to FIG. 3, in response to each SEARCH instruction, processor 2 fetches a pair of elements in one clock cycle as a single data quantity (301). For example, processor 2 may fetch two adjacent 16-bit values as one 32-bit quantity. Next, processor 2 compares the even element of the pair to a current minimum value for the even elements (302) and the odd element of the pair to a current minimum value for the odd elements (304).

When a new minimum value for the even elements is detected, processor 2 updates accumulator A0 to hold the new minimum value and updates a pointer register $P_{Even}$ to hold a pointer to point to a corresponding data quantity within the array (303). Similarly, when a new minimum value for the odd elements has been detected, processor 2 updates accumulator A1 and a pointer register $P_{Odd}$ (305). In this example, each pointer register $P_{Even}$ and $P_{Odd}$ points to the data quantity and not the individual elements, although the process is not limited as such. Processor 2 repeats the process until all of the elements within the array have been processed (306). Because processor 2 is pipelined, element pairs may be fetched until the array is processed.

The following illustrates exemplary syntax for invoking the machine instruction:

($P_{Odd}$, $P_{even}$)=SEARCH $R_{Data}$ LE, $R_{Data}$=[$P_{fetch\_addr++}$]

Data register $R_{Data}$ is used as a scratch register to store each newly fetched data element pair, with the least significant word of $R_{Data}$ holding the odd element and the most significant word of $R_{Data}$ holding the even element. Two accumulators, A0 and A1, are implicitly used to store the actual values of the results. An additional register, $P_{fetch\_addr}$, is incremented when the SEARCH instruction is issued and is used as a pointer to iterate over the N/2 data quantities within the array. The defined condition, such as "less than or equal" (LE) in the above example, controls which comparison is executed and when the pointer registers $P^{Even}$ and $P_{Odd}$, as well as the accumulators A0 and A1, are updated. The "LE", for example, directs processor 2 to identify the last occurrence of the minimum value.

In a typical application, a programmer develops a software application or subroutine that issues the N/M search instructions, probably from within a loop construct. The programmer may write the software application in assembly language or in a high-level software language. A compiler is typically invoked to process the high-level software application and generate the appropriate machine instructions for processor 2, including the SEARCH machine instructions for searching the array of data.

Figure 4:
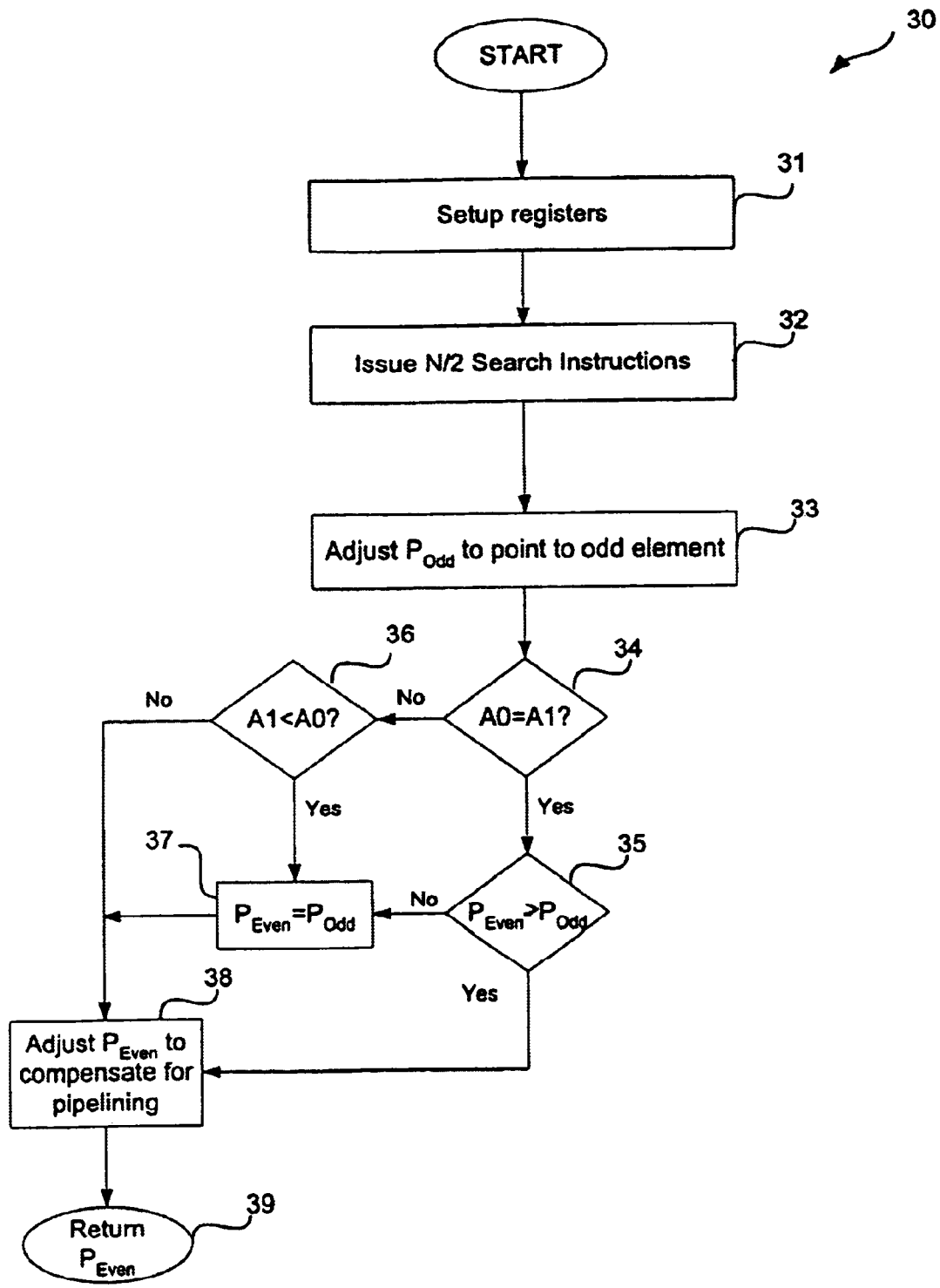
FIG. 4 is a flowchart of an example routine for invoking the machine instruction.

FIG. 4 is a flowchart of an example software routine 30 for invoking the example machine instructions illustrated above. First, the software routine 30 initializes the registers including initializing A0 and A1 and pointers $P_{Even}$ and $P_{Odd}$ to the first data quantity within the array (31). In one embodiment, software routine 30 initializes a loop count register with the number of SEARCH instructions to issue (N/M). Next, routine 30 issues the SEARCH machine instruction N/M times (32). This can be accomplished a number of ways, such as by invoking a hardware loop construct supported by processor 2. Often, however, a compiler may unroll a software loop into a sequence of identical SEARCH instructions (32).

After issuing N/M search instructions, A0 and A1 hold the last occurrence of the minimum even value and the last occurrence of the minimum odd value, respectively. Furthermore, $P_{Even}$ and $P_{Odd}$ store the locations of the two data quantities that hold the last occurrence of the minimum even value and the last occurrence of the minimum odd value.

Next, in order to identify the last occurrence of the minimum value for the entire array, routine 30 first increments $P_{Odd}$ by a single element, such that $P_{Odd}$ points directly at the minimum odd element (33). Routine 30 compares the accumulators A0 and A1 to determine whether the accumulators contain the same value, i.e., whether the minimum of the odd elements equals the minimum of the even elements (34). If so, the routine 30 compares the pointers to determine whether $P_{Odd}$ is less than $P_{Even}$ and, therefore, whether the minimum even value occurred earlier or later in the array (35). Based on the comparison, the routine determines whether to copy $P_{Odd}$ into $P_{Even}$ (37).

When the accumulators A0 and A1 are not the same, the routine compares A0 to A1 in order to determine which holds the minimum value (36). If A1 is less than A0 then routine 30 sets $P_{Even}$ equal to $P_{Odd}$, thereby copying the pointer to the minimum value from $P_{Odd}$ into $P_{Even}$ (37).

At this point, $P_{Even}$ points to the last occurrence of the minimum value for the entire array. Next, routine 30 adjusts $P_{Even}$ to compensate for errors introduced to the pipelined architecture of processor 2 (38). For example, the comparisons described above are typically performed in the EX stage of pipeline 4 while incrementing the pointer register $P_{fetch\_addr}$ typically occurs during the AC stage, thereby causing the $P_{Odd}$ and $P_{Even}$ to be incorrect by a known quantity. After adjusting $P_{Even}$, routine 30 returns $P_{Even}$ as a pointer to the last occurrence of the minimum value within the array (39).

Figure 5:
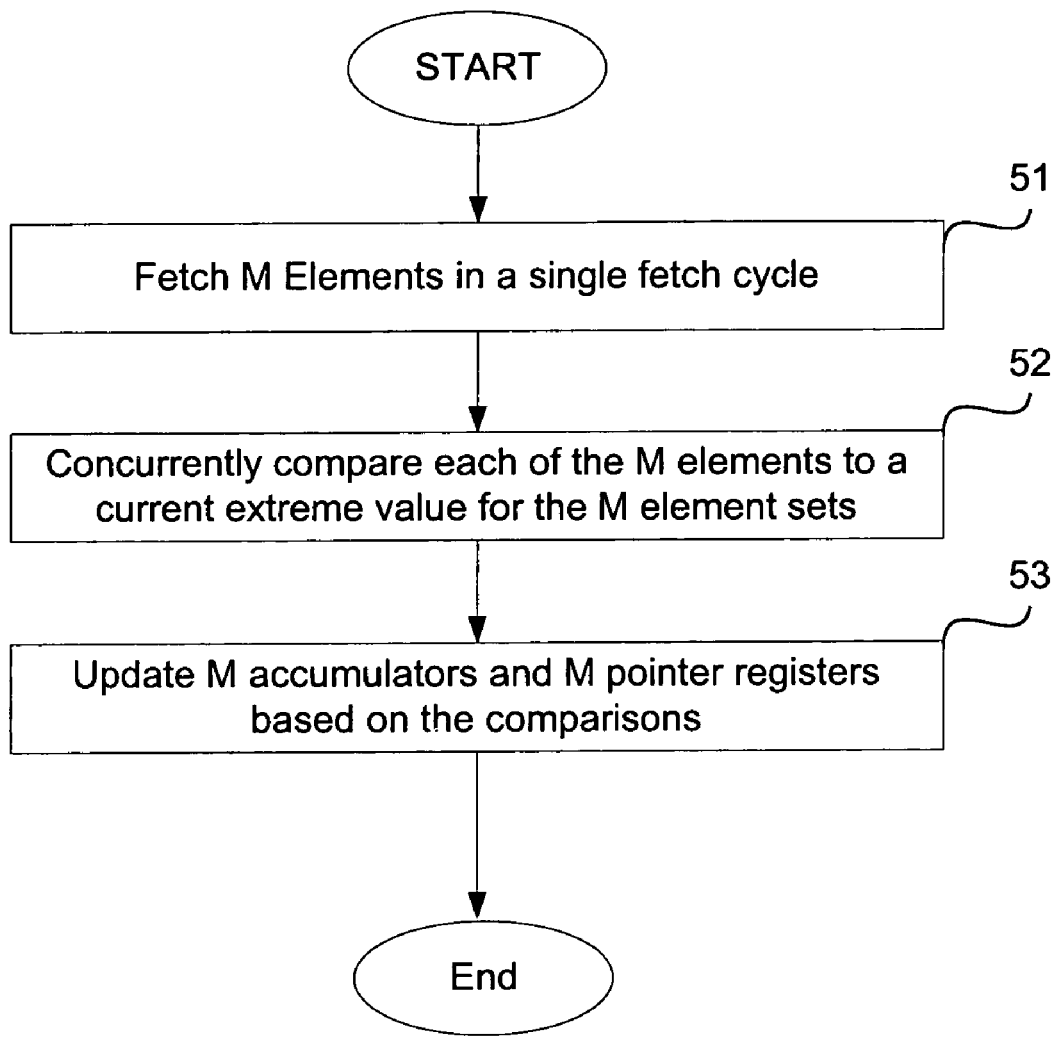
FIG. 5 is a flowchart for a single SEARCH instruction.

FIG. 5 illustrates the operation for a single SEARCH instruction as generalized to the case where processor 2 is capable of processing M elements of the array in parallel, such as when processor 2 includes M execution units. The SEARCH instruction causes processor 2 to fetch M elements in a single fetch cycle (51). Furthermore, in this example, processor 2 maintains M pointer registers to store addresses (locations) of corresponding extreme values for the M sets of elements. After fetching the M elements, processor 2 concurrently compares the M elements to current extreme values for the respective element sets, as stored in M accumulators (52). Based on the comparisons, processor 2 updates the M accumulators and the M pointer registers (53).

Figure 6:
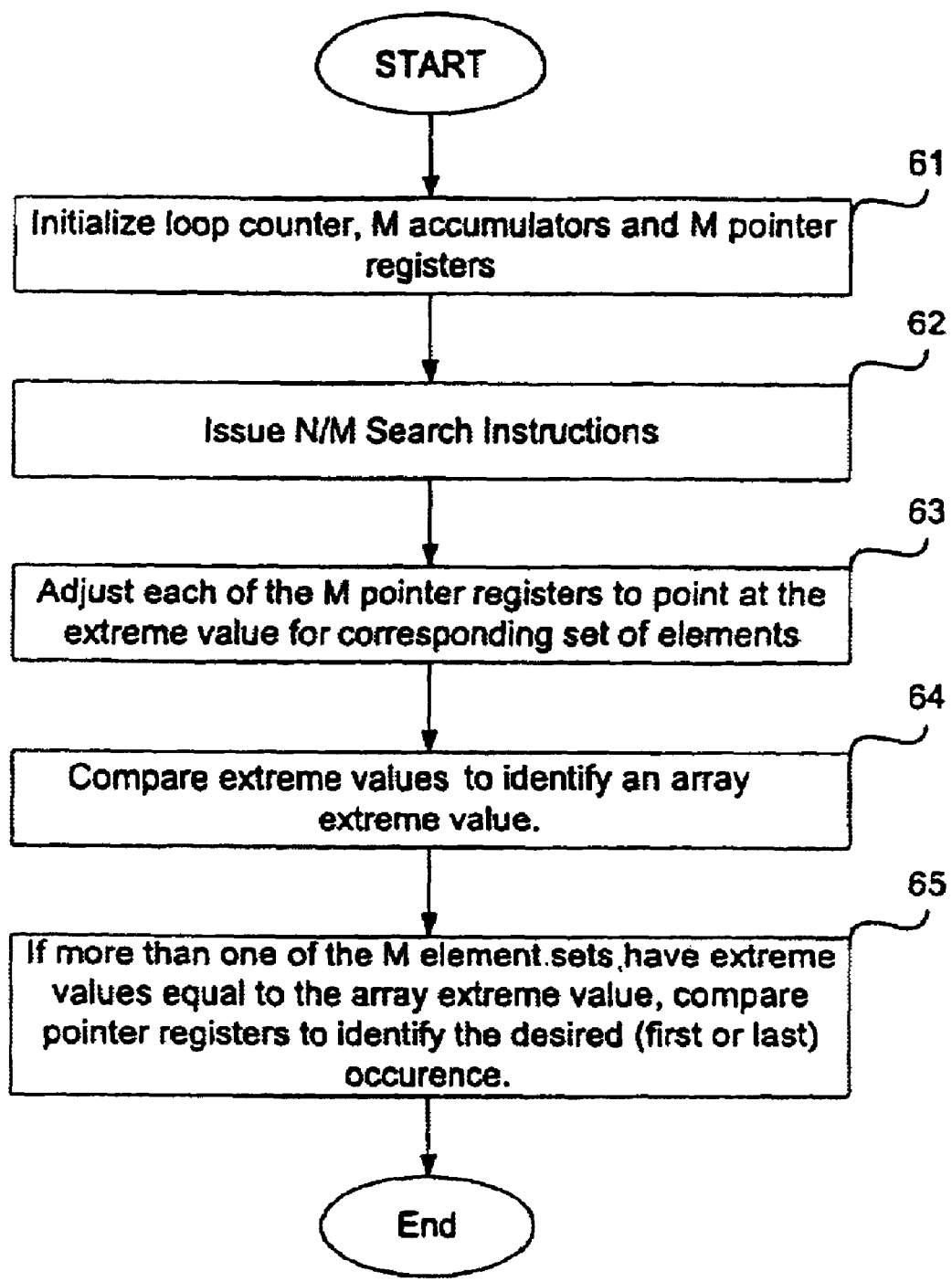
FIG. 6 is a flowchart where a software application issues N/M SEARCH instructions and, upon completion of the N/M SEARCH instructions, determines an extreme value for an entire array.

FIG. 6 illustrates the general case where a software application issues N/M SEARCH instructions and, upon completion of the instructions, determines the extreme value for the entire array. First, the software application initializes a loop counter, the M accumulators used to store the current extreme values for the M element sets and the M pointers used to store the locations of the extreme values (61). Next, the software application issues N/M SEARCH instructions (62). After completion of the instructions, the software application may adjust each of the M pointer registers to correctly reference its respective extreme value, instead of the data quantity holding the extreme value (63). After adjusting the pointer registers, the software application compares the M extreme values for the M element sets to identify an extreme value for the entire array, i.e., a maximum value or a minimum value (64). Then, the software application may use the pointer registers to determine whether more than one of the element sets have an extreme value equal to the array extreme value and, if so, determine which extreme value occurred first, or last, depending upon the desired search function (65).

Various embodiments of the invention have been described. For example, a single machine instruction has been described that searches an array of data in a manner that facilitates vectorization of the search process within a pipelined processor. The processor may be implemented in a variety of systems including general purpose computing systems, digital processing systems, laptop computers, personal digital assistants (PDA's) and cellular phones. For example, cellular phones often maintain an array of values representing signal strength for services available 360° around the phone. In this context, the process discussed above can be readily used upon initialization of the cellular phone to scan the available services and quickly select the best service. In such a system, the processor may be coupled to a memory device, such as a FLASH memory device or a static random access memory (SRAM), that stores an operating system and other software applications. These and other embodiments are within the scope of the following claims.

What is claimed is:

1. A method comprising:

retrieving a pair of data elements from an array of elements in a single fetch operation, wherein the pair of data elements includes an even data element and an odd data element;

substantially comparing the even element of the pair with an even extreme value;

if the even element of the pair exceeds the even extreme value, storing the even element of the pair as the even extreme value and storing a parameter indicative of an address of the even element of the pair in a pointer register, wherein storing the parameter indicative of an address of the even element of the pair in a pointer register comprises maintaining a first pointer register to store an address for the extreme value of the even data elements;

concurrent with said comparing the even element of the pair with the even extreme value, comparing the odd element of the pair with an odd extreme value;

if the odd element of the pair exceeds the odd extreme value, storing the odd element of the pair as the odd extreme value, and further comprising maintaining a second pointer register to store an address for the extreme value of the odd data elements;

substantially fetching and comparing remaining pairs of data elements of the array until all of the data elements of the array have been processed; and adjusting at least one of the pointer registers after processing all of the pairs of data elements to account for a number of stages in a pipeline.

2. The method of claim 1, further comprises setting the even extreme value as a function of the even element of the element pair and setting the odd extreme value as a function of the odd element of the element pair.

3. The method of claim 1, further comprises maintaining a first accumulator to store a minimum value for the even elements and a second accumulator to store a minimum value for the odd elements.

4. The method of claim 1, wherein the method is invoked by issuing N/M machine instructions to a programmable processor, wherein N equals a number of elements in the array, and M equals a number of data elements that the processor can concurrently compare.

* * * * *